(12) United States Patent
Kopp et al.

(10) Patent No.: US 8,493,562 B2
(45) Date of Patent: Jul. 23, 2013

(54) OPTICAL DEVICE WITH SUPERIMPOSED PHOTONIC CIRCUITS FOR COUPLING TO ONE OR MORE OPTICAL WAVEGUIDES

(75) Inventors: Christophe Kopp, Fontanil-Cornillon (FR); Jean-Marc Fedeli, Saint Egreve (FR); Regis Orobtchouk, Fitilieu (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 452 days.

(21) Appl. No.: 12/679,546

(22) PCT Filed: Oct. 1, 2008

(86) PCT No.: PCT/EP2008/063163
§ 371 (c)(1),
(2), (4) Date: Jul. 7, 2010

(87) PCT Pub. No.: WO2009/043880
PCT Pub. Date: Apr. 9, 2009

(65) Prior Publication Data
US 2010/0265504 A1    Oct. 21, 2010

(30) Foreign Application Priority Data

Oct. 3, 2007  (FR) ...................................... 07 58043

(51) Int. Cl.
*G01J 4/00*  (2006.01)
(52) U.S. Cl.
USPC ........................................................ 356/364
(58) Field of Classification Search
USPC ........................................................ 356/364
See application file for complete search history.

(56) References Cited

U.S. PATENT DOCUMENTS

| | | | |
|---|---|---|---|
| 5,276,745 A | 1/1994 | Revelli | |
| 5,581,643 A * | 12/1996 | Wu | 385/17 |
| 6,166,372 A | 12/2000 | Yamamoto et al. | |
| 6,639,887 B1 | 10/2003 | Izawa | |
| 6,718,093 B2 * | 4/2004 | Zhou | 385/37 |
| 6,845,184 B1 * | 1/2005 | Yoshimura et al. | 385/14 |
| 7,050,675 B2 * | 5/2006 | Zhou | 385/37 |
| 7,065,272 B2 * | 6/2006 | Taillaert et al. | 385/37 |
| 7,068,887 B1 | 6/2006 | Gunn et al. | |
| 8,165,437 B2 * | 4/2012 | Pyo et al. | 385/37 |
| 2002/0126942 A1 | 9/2002 | Evans | |
| 2003/0235370 A1 * | 12/2003 | Taillaert et al. | 385/50 |
| 2004/0114642 A1 | 6/2004 | Bullington et al. | |
| 2004/0184156 A1 * | 9/2004 | Gunn et al. | 359/629 |
| 2006/0008207 A1 | 1/2006 | Gunn et al. | |
| 2008/0240659 A1 | 10/2008 | Kopp | |

OTHER PUBLICATIONS

Lee, Chee-Wei et al., "Vertical Coupler Architecture For Polarization-Independent Coupling And Polarization-Selective Coupling", Proceedings of SPIE, vol. 5644, pp. 459-464, (Jan. 17, 2005) XP 002488406.*
Bogaerts, Wim et al., "Silicon-on-Insulator Nanophotonics", Proceedings of SPIE, vol. 5956, pp. 1-15 (Sep. 16, 2005) XP 002488407.
Barwicz, T. et al., "Polarization-Transparent Microphotonic Devices in the Strong Confinement Limit", Nature Photonics, vol. 1, pp. 57-60 (Jan. 2007).

* cited by examiner

*Primary Examiner* — Roy M Punnoose
(74) *Attorney, Agent, or Firm* — Oblon, Spivak, McClelland, Maier & Neustadt, L.L.P.

(57) ABSTRACT

Optical device with superimposed photonic circuits, for coupling to an optical waveguide.
Said device comprises a substrate (44) and, on said substrate, an integrated photonic circuit (46) adapted to be coupled to at least one optical waveguide (48) which transmits a light signal (50) and for processing said signal. According to the invention, the circuit comprises two superimposed elementary integrated photonic circuits (52, 54), each of which is adapted to be coupled to a given polarization state of the signal and to process this state. The invention applies particularly to optical telecommunications.

12 Claims, 5 Drawing Sheets

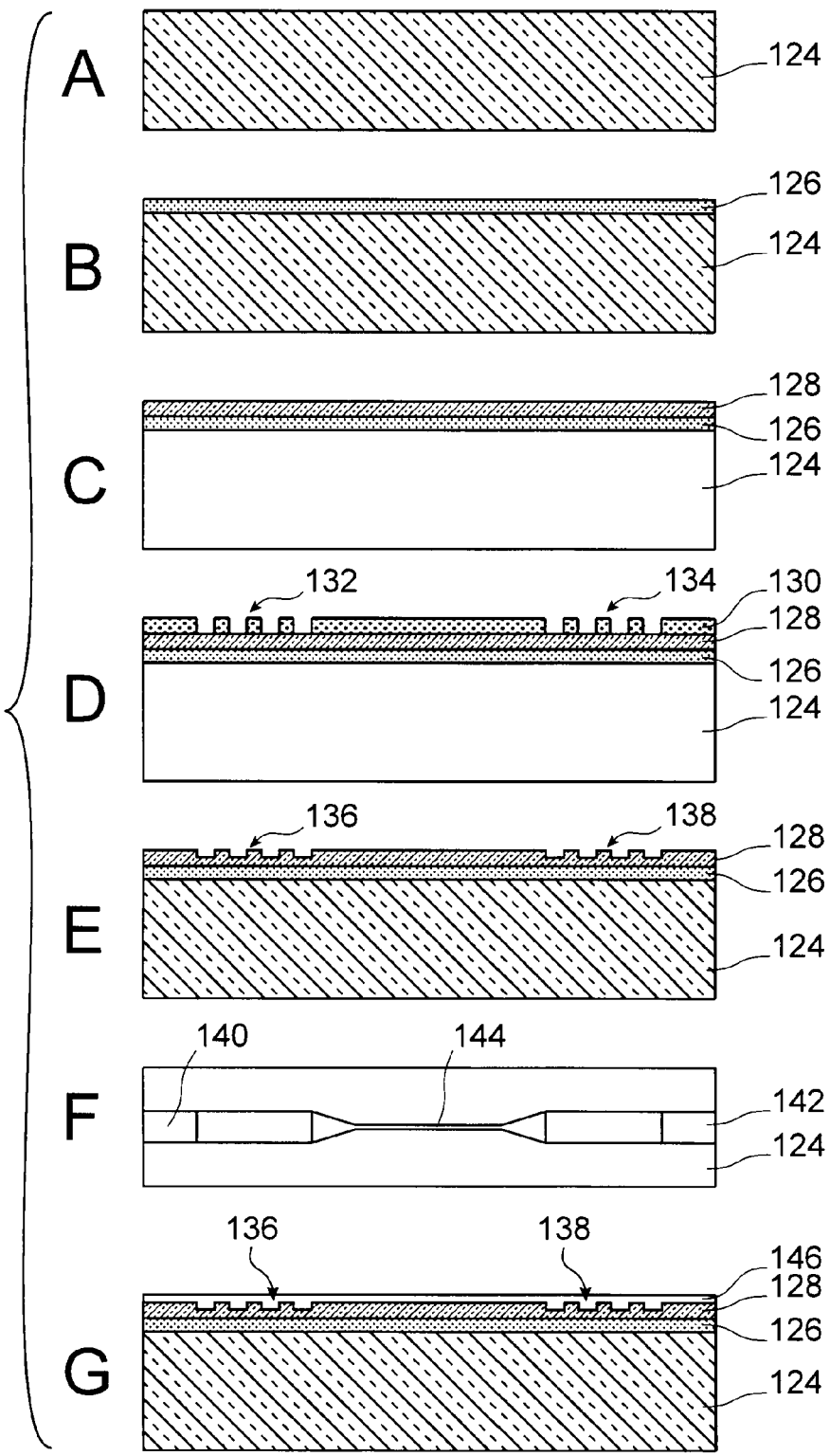

OPTICAL DEVICE WITH SUPERIMPOSED PHOTONIC CIRCUITS FOR COUPLING TO ONE OR MORE OPTICAL WAVEGUIDES

TECHNICAL FIELD

The present invention relates to an optical device comprising an integrated photonic circuit, intended to be coupled to one or more optical waveguides, in particular one or more optical fibres.

It applies in particular to optical telecommunications and, more specifically, to data transmission networks.

In addition, although the present invention applies to any photonic circuit, or optical circuit, it applies quite particularly to nanophotonic circuits. It will be recalled that the transversal sections of the optical waveguides of said nanophotonic circuits have dimensions that do not exceed 1 µm.

Technologies that implement planar optical waveguides make it possible to integrate in a compact manner, on a same chip, complex functions for managing light beams such as for example multiplexing, de-multiplexing, modulation and spectral routing.

All of these functions are necessary not just for optical links at very short distance, of the order of 1 mm (for example intra-chip links), but also for optical links at very long distance, of the order of several kilometers (for example metropolitan networks), to provide a solution to the increase in the rate of interconnection buses.

The integration of more optical functions on a same chip necessitates an extensive miniaturisation of the optical circuit that said chip comprises, which leads to miniaturising the traversal section of the planar optical waveguides down to sub-micronic dimensions.

However, for applications relative to medium and long distances, in other words distances ranging from a few meters to several kilometers, the favoured optical transport medium is the optical fibre, the transversal section dimensions of which range from 10 µm to a few tens of micrometers.

Consequently, optical coupling systems between the planer optical waveguides and the optical fibres have to compensate this increasing dimensional mismatch as well as different behaviour vis-à-vis the polarisation of the light.

A nanophotonic circuit is naturally very sensitive to polarisation. For reception, this sensitivity is incompatible with a direct connection of the circuit to a network of optical fibres in which the polarisation state is both unknown and unstable. Consequently, for reception, it is necessary to separate the two fundamental polarisation states TE and TM and to process them separately on the circuit.

It will be recalled that, by convention, on an optical circuit formed in a given plane, these states TE and TM are defined such that TE corresponds to a transverse electric field, parallel to the plane of the circuit, and that TM corresponds to a transverse magnetic field, perpendicular to the plane of the circuit.

This is schematically illustrated in FIG. 1 which shows the plane P of an optical circuit and an electromagnetic wave O that moves along a direction z parallel to the plane P. This electromagnetic wave has two components, namely an electric field, which is measured parallel to the plane P and noted TE, and a magnetic field which is measured perpendicular to the plane P and noted TM. The polarisation of the wave is identical to the electric field and, in the case represented, it is horizontal.

Generally speaking, these polarisation states or polarisation modes TE and TM, which are orthogonal, may also be noted "x-pol" and "y-pol".

STATE OF THE PRIOR ART

A structure, which is compatible with the above mentioned need of separating the two states TE and TM, is known through the following documents, to which one will refer:
[1] U.S. Pat. No. 7,065,272
[2] U.S. Pat. No. 7,068,887
[3] Article by Wim Bogaerts et al., "Silicon-on-insulator nanophotonics, IMEC, Information Technology Department, University of Gent, Belgium, 2005.

It uses a two dimensional diffraction grating. Everything takes place as if such a grating comprises two one dimensional diffraction gratings, at 90° to each other. In this way, the TM component of a light beam in relation to the first grating is coupled as TE component in relation to the second grating.

This is schematically illustrated in FIG. 2. This figure corresponds to FIG. 13(a) of document [3], to which one will refer. It shows a nanophotonic circuit 2, which is formed by a substrate 4, as well as three axes x, y and z. The axes x and y are perpendicular to the plane of the circuit 2 and perpendicular to each other whereas the axis z is perpendicular to the plane of the circuit.

A singlemode optical fibre 6 transmits a light 8 that is coupled to the circuit and which is processed in said circuit. Another singlemode optical fibre 10 recovers the light thus processed.

In fact, this figure shows a polarisation diversity diagram and, to implement the latter, a two dimensional grating coupler 12 or 2-D grating coupler is used as polarization splitter, at the input of the circuit 2, and an identical coupler 14 at the output of said circuit.

Thus, as may be seen, the two polarisation states present in the fibre 6 are separated and each of them is processed in its own circuit 16 or 18. In the example, the circuits 16 and 18 are circular ring resonators. Obviously, the two circuits 16 and 18 must be identical or almost identical. At the output, these two circuits 16 and 18 are "merged" by means of the coupler 14.

It ensues from all this that the nanophotonic circuit 2 only processes TE polarisations, which are favourable to the best performances. It has moreover been shown that a circuit using this solution was by and large insensitive to the polarisation of the beam. On the other hand, the insertion losses from this type of coupling structure, which have been published until now, are not less than 6 dB.

Another structure, which is compatible with the above mentioned solution, is known through the following document to which one will refer:
[4] Article by Timon Barwicz et al., "Polarization-transparent microphotonic devices in the strong confinement limit", Nature Photonics, vol. 1, January 2007, pp. 57-60.

This other structure (FIG. 3) comprises a coupling part 20, which is not very sensitive to polarisation, and a second part 22 that separates the TE and TM states (in the zone 24) while at the same time converting the TM state into TE (in the zone 26).

This solution, known through the document [4], necessitates a technology of very high resolution to form the second part 22.

The overall polarisation insensitivity of a circuit using this solution has been demonstrated. On the other hand, the performances including the insertion losses of the coupling structure seem low.

Thus, the known solutions that have just been described have the drawback of having rather low performance, with high insertion losses that are in all likelihood at least equal to 6 dB. In addition, the management of the two incident polarisation states in two almost identical circuits, in a same plane (FIG. 2), increases the size of the optical circuit and reduces the possibilities for developing complex circuits.

DESCRIPTION OF THE INVENTION

The aim of the present invention is to overcome the preceding drawbacks.

More precisely, the object of the present invention is an optical device comprising a substrate and, on this substrate, an integrated photonic circuit which is adapted, on the one hand, to be optically coupled to at least one optical waveguide, in particular an optical fibre, provided to transmit a light signal and, on the other hand, for processing the light signal, said device being characterised in that the integrated photonic circuit comprises first and second elementary integrated photonic circuits which are superimposed, each of the first and second elementary integrated photonic circuits being adapted to be coupled to a given polarisation state of the light signal and for processing this given polarisation state.

Preferably, the second elementary integrated photonic circuit is between the substrate and the first elementary integrated photonic circuit, the first elementary integrated photonic circuit being intended to receive the light signal and adapted for coupling to a first polarisation state of the light signal, the second elementary integrated photonic circuit being adapted to be coupled to a second polarisation state of the light signal.

Preferably, the first and second elementary integrated photonic circuits are nanophotonic circuits.

According to a preferred embodiment of the device object of the invention, each of the first and second elementary integrated photonic circuits comprises a part for coupling to the given polarisation state of the light signal and a part for processing the given polarisation state of the light signal thus coupled, and the respective coupling parts of the first and second elementary integrated photonic circuits are superimposed.

Preferably, the second elementary integrated photonic circuit is between the substrate and the first elementary integrated photonic circuit, the first elementary integrated photonic circuit being intended to receive the light signal and adapted to be coupled to a first polarisation state of the light signal, the second elementary integrated photonic circuit being adapted to be coupled to a second polarisation state of the light signal, the coupling part of the first elementary integrated photonic circuit is adapted to be coupled to the first polarisation state of the light signal, and the coupling part of the second elementary integrated photonic circuit is adapted to be coupled to the second polarisation state of the light signal.

Preferably, each coupling part comprises a one dimensional diffraction grating.

According to a first specific embodiment of the invention, each of the one dimensional diffraction gratings comprises parallel lines and the lines of one of the one dimensional diffraction gratings are parallel to the lines of the other one dimensional diffraction grating.

According to a second specific embodiment, each of the one dimensional diffraction gratings comprises parallel lines and the lines of one of the one dimensional diffraction gratings are perpendicular to the lines of the other one dimensional diffraction grating.

In an alternative, each coupling part includes a diffraction grating chosen among gratings with curved patterns, gratings with variable pitch from one pattern to the next, photonic gratings and diffractive optics.

The optical device, object of the invention, may further comprise a light reflecting structure, placed below the set of superimposed coupling parts.

The optical device, object of the invention, may also comprise a photodetector adapted to detect the polarisation states that are processed by the first and second elementary integrated photonic circuits.

BRIEF DESCRIPTION OF DRAWINGS

The present invention will be better understood on reading the description of examples of embodiments given hereafter, purely by way of indication and in no way limiting, and by referring to the appended drawings, among which.

DETAILED DESCRIPTION OF SPECIFIC EMBODIMENTS

It is known that it is possible to attain insertion losses of the order of 3 dB for a given polarisation state, from a one dimensional diffraction grating or 1-D grating.

Figure 1:
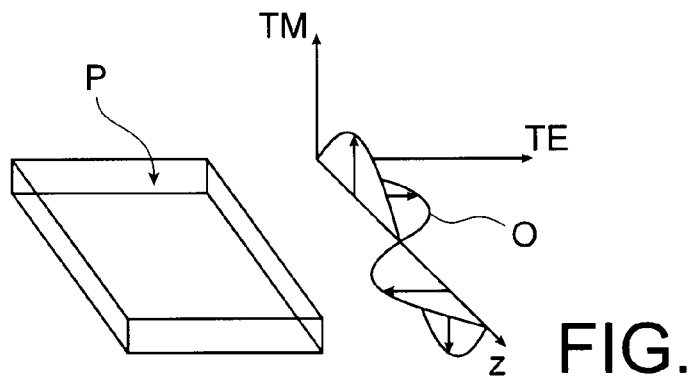
FIG. 1 schematically illustrates two fundamental polarisation states and has already been described, FIG. 2 schematically illustrates a polarisation diversity diagram using 2-D grating couplers and has already been described, FIG. 3 schematically illustrates a structure separating the TE and TM polarisations, with conversion of TM into TE, and has already been described, FIG. 4 schematically illustrates grating couplers serving respectively to couple the light stemming from a fibre into a nanophotonic guide structure and to return it into another fibre.
Figure 2:
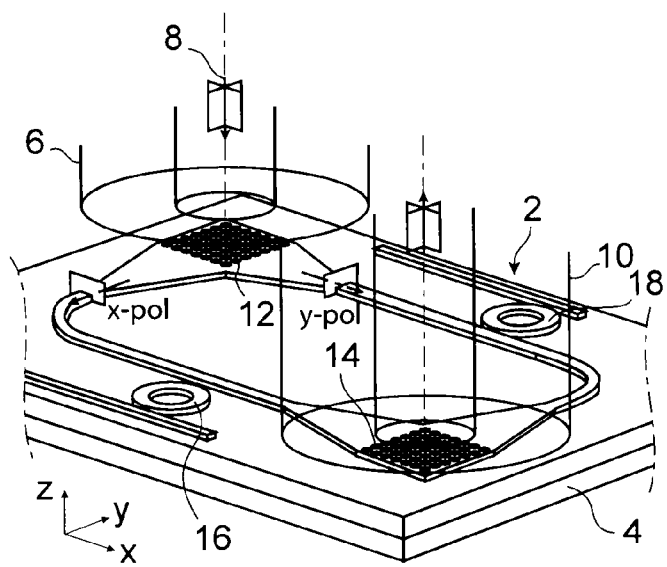
Figure 3:
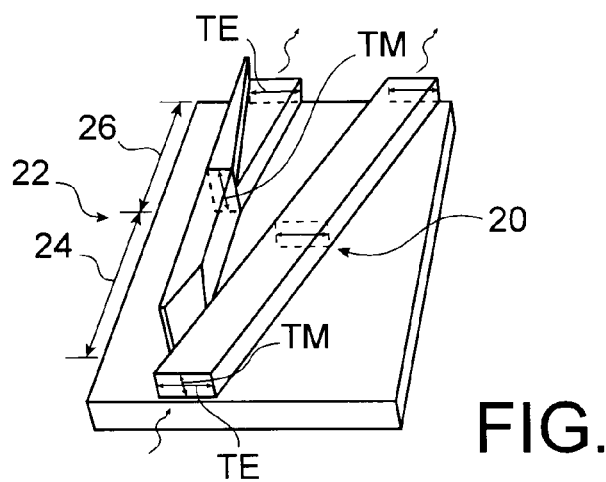
Figure 4:
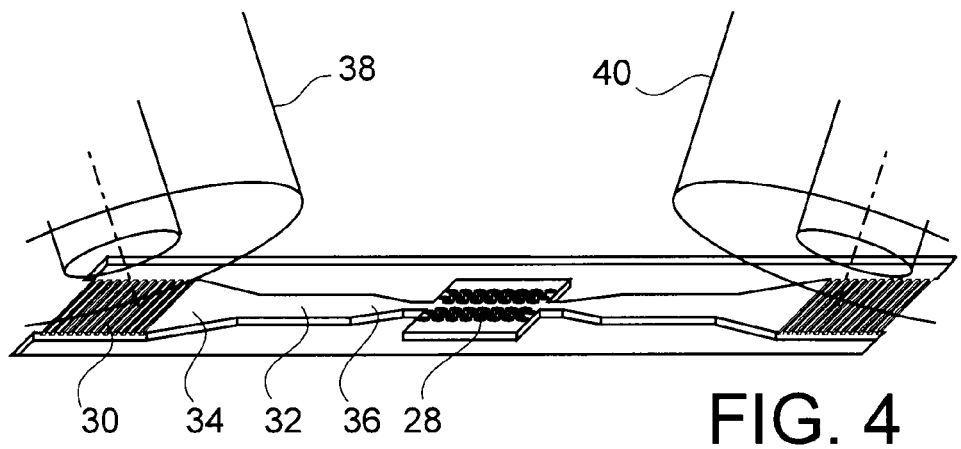

This is the case of the symmetrical structure represented in FIG. 4 which corresponds to FIG. 11(a) of document [3]. This structure includes a nanophotonic wave guide 28, each end of which is connected to a 1-D grating 30 by means of a ridge waveguide 32 and adiabatic tapers 34 and 36, so as to couple singlemode optical fibres 38 and 40 to the structure, through the intermediary of the 1-D gratings.

Figure 5:
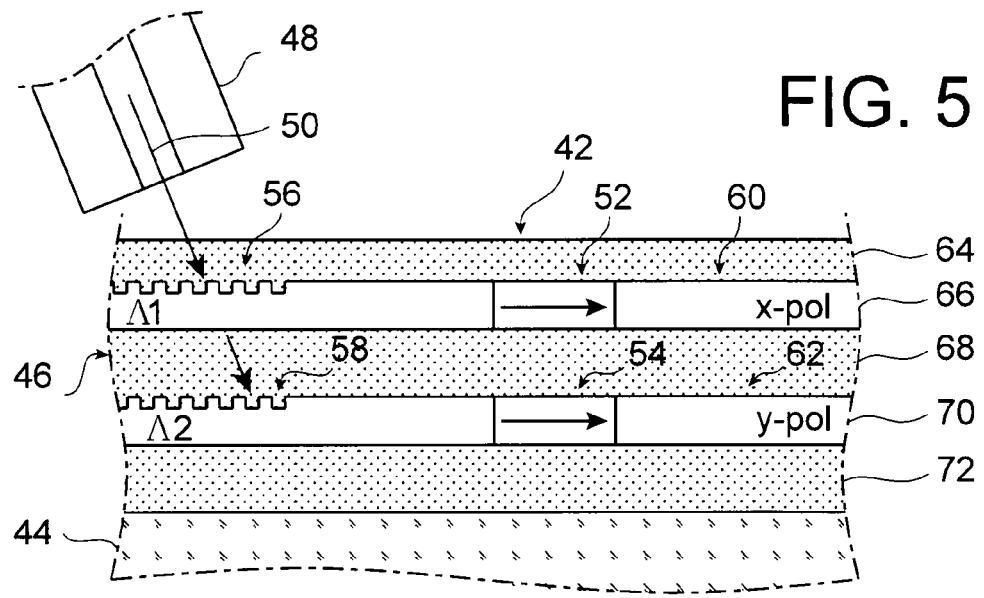
FIG. 5 is a schematic sectional view of a specific embodiment of the optical device, object of the invention.

FIG. 5 is a schematic sectional view of an example of the invention.

It shows an optical device 42 comprising a substrate 44 and, on this substrate, an integrated photonic circuit 46 which is adapted, on the one hand, to be optically coupled to an optical fibre 48, provided to transmit a light signal 50 and, on the other hand, for processing the light signal.

The optical fibre 48 may be multimode but it is preferably singlemode.

The integrated optical circuit 46 comprises two nanophotonic circuits 52 and 54 which are superimposed: the circuit 54 is between the circuit 52 and the substrate 44. Each of these nanophotonic circuits is adapted to be coupled to a given polarisation state of the light signal and for processing said given polarisation state.

The two polarisation states of the light signal are noted x-pol and y-pol and, in the example, the upper circuit 52 processes the x-pol state, whereas the lower circuit 54 processes the y-pol state.

In the example, each of the nanophotonic circuits 52 or 54 comprises a part 56 or 58 for coupling to the given polarisation state of the light signal 50 and a part 60 or 62 for processing the x-pol or y-pol polarisation state thus coupled; furthermore, the respective coupling parts 56 and 58 of the circuits 52 and 54 are superimposed; and each coupling part 56 or 58 is a one dimensional diffraction grating, thus comprising parallel and periodic lines (which are perpendicular to the plane of the figure); the period or pitch of the grating 56 is noted Λ1 and that of the grating 58 is noted Λ2.

In the example, ridged gratings are used so that the lines are ridges, and the ridges of the grating 56 are parallel to the ridges of the grating 58. An alternative of this example will be described later.

In the device of FIG. 5 is thus exploited the high polarisation selectivity of a 1-D grating that couples a polarisation state to the processing part, or processing circuit, which is associated with this grating, and allows the other polarisation state to pass.

In the example considered, in order for the grating 56 to couple the x-pol state and allow the y-pol state to pass, play is made on the properties of the materials used or on the geometry of the grating, by modifying for example the pitch of the grating, the filling rate (width of the full slots compared to width of the empty slots), and/or the modulation depth (height of the slots).

Similarly, in order for the grating 58 to couple the y-pol state and allow the x-pol state to pass, play is made on the properties of the materials used or on the geometry of the grating, by modifying for example the pitch of the grating, the filling rate (width of the full slots compared to width of the empty slots), and/or the modulation depth (height of the slots).

It is precised that the optical waveguide that connects the parts 56 and 60 (respectively 58 and 62) is provided with an adiabatic taper on the side of the coupling part 56 (respectively 58) to connect to it properly. And, if it is necessary, it comprises another adiabatic taper on the side of the circuit 60 (respectively 62) to connect to it properly.

Solely by way of indication and in no way limiting, the circuit 46 is formed in a stack constituted, in going towards the substrate 44, of a layer of silica 64, of a layer of silica 66, of a buried layer of silica 68, of another layer of silica 70 and of another buried layer of silica 72 which thus rests on the substrate 44. And, as may be seen, the nanophotonic circuits 52 and 54 are respectively formed in the layers of silica 66 and 70, more specifically in optical waveguides formed in said layers 66 and 70.

The optical waveguides and the coupling gratings can, obviously, have different geometries in order to be optimised at the favoured polarisation state.

The optical waveguides may be of different types: for example, it is possible to have an optical ridge waveguide and an optical stripe waveguide or two optical ridge waveguides or two optical stripe waveguides.

The technologies used to make the circuits may be identical or different, with for example:
monocrystalline silicon for the circuits 52 and 54,
or amorphous silicon for these circuits 52 and 54,
or monocrystalline silicon for the circuit 52 and amorphous silicon for the circuit 54,
or amorphous silicon for the circuit 52 and monocrystalline silicon for the circuit 54.

The coupling rate of the gratings may be reinforced by different techniques: for example, a reflective structure may be added under the grating situated on the side of the substrate, such as for example a Bragg mirror or Bragg reflector (see later), a metal mirror or a photonic crystal.

A photodetector, for example a photodetector made of germanium, may be provided in the circuit 46, following processing parts or circuits 60 and 62, said photodetector having a sufficient thickness to capture the light stemming from each of said circuits 60 and 62.

Figure 6:
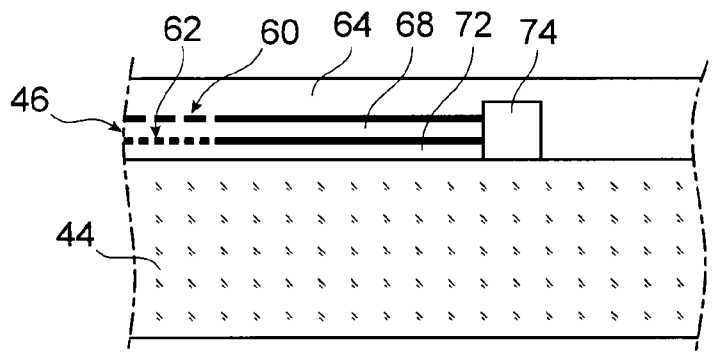
FIG. 6 is a schematic sectional view of another specific embodiment of the invention.

This is schematically illustrated by FIG. 6, where the photodetector has the reference numeral 74.

In a non represented alternative of the invention, the circuit 60 (respectively 62) is extended by a 1-D grating identical to the grating 56 (respectively 58), these additional gratings are superimposed and an optical fibre is placed opposite the additional grating the furthest from the substrate, to recover the light stemming from each of said additional gratings.

The light thus recovered is in fact the light that was transmitted by the fibre 50 and which has been processed by the circuits 60 and 62.

In another alternative of the invention, the 1-D gratings are formed so as to be crossed. The ridges of the grating 56 are then perpendicular to the ridges of the grating 58. This makes it possible to obtain the same polarisation states in the optical waveguides that extend the gratings.

Figure 7:
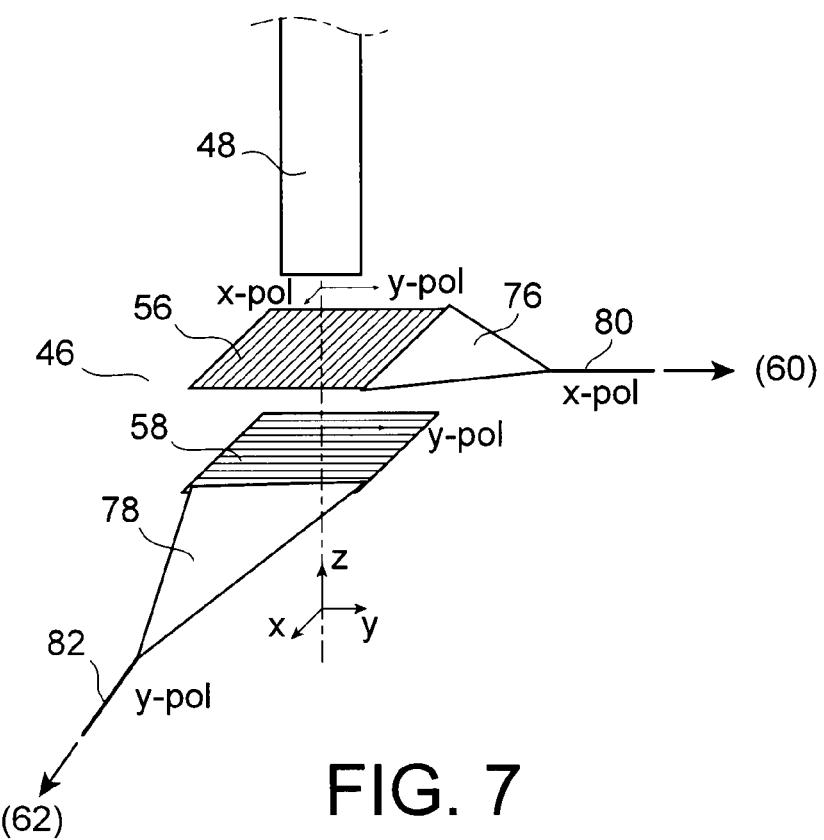
FIG. 7 is a schematic and partial perspective view of another specific embodiment of the invention.

This is schematically and partially illustrated by the perspective view of FIG. 7 where only TE modes are propagated in the circuits 60 and 62 because of the fact that the gratings 56 and 58 are crossed at 90°.

In this example, the axis of the fibre 48 is perpendicular to the plane of the circuit 46. The adiabatic taper 76 or 78 which connects the grating 56 or 58 to the optical waveguide 80 or 82 leading to the processing circuit 60 or 62 may be seen.

Particular advantages provided by the invention are the following:
the invention leads to a good coupling rate between the circuit 46 and the fibre 48 thanks to the use of 1-D gratings 56 and 58,
it enables an optimised processing of the two polarisation states of the light transmitted by the fibre 48, and
it leads to a reduction in the size of the optical circuit intended to process this light.

Figure 8:
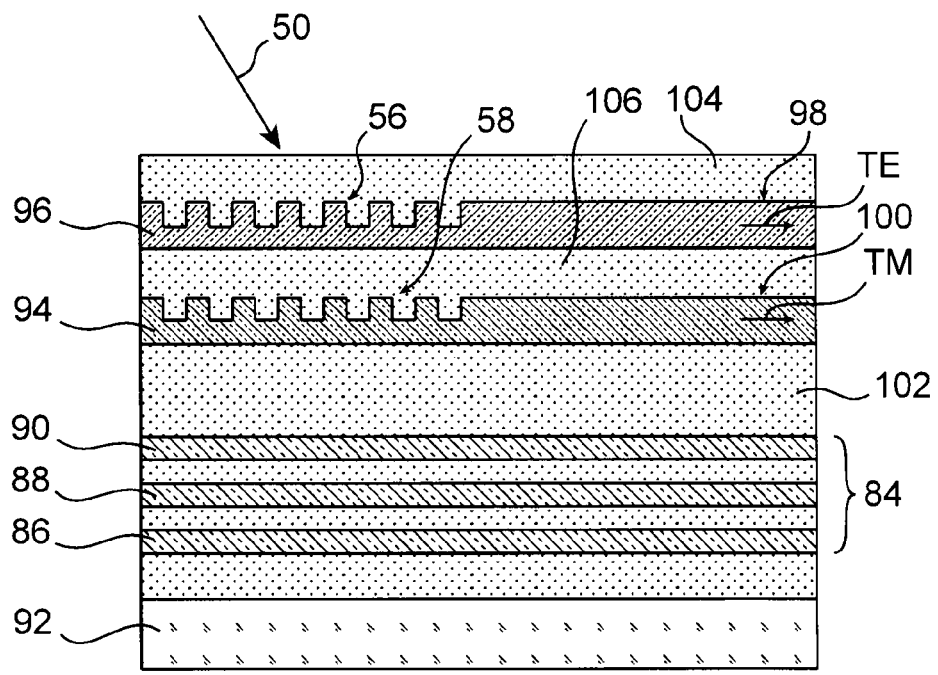
FIG. 8 is a schematic and partial sectional view of another specific embodiment of the invention.

An example of design of the device object of the invention is illustrated in FIG. 8. It comprises a Bragg reflector 84 composed of:
three alternations of layers of amorphous silicon 86, 88, 90 which are deposited on the surface of a silicon substrate 92, and
a layer of silicon 94 and a layer of amorphous silicon 96 that are each 200 nm thick and on which are etched the two 1-D coupling gratings 56 and 58.

It should be noted that the layer of silicon 94 may be replaced by a layer of amorphous silicon.

The role of the Bragg reflector is to redirect the transmitted beam, which is normally lost, towards the two coupling gratings in order to increase the coupling efficiency. The diffraction gratings 56 and 58, which are etched in the layers 96 and 94 respectively made of amorphous silicon and silicon, make it possible to inject the TE and TM components of the incident light beam 50 respectively into the optical waveguide of amorphous silicon 98 and into the optical waveguide of silicon 100 that follow respectively said gratings 56 and 58.

In FIG. 8 may also be seen:
  a layer of silica 102 which is between the substrate 92 and the layer of amorphous silicon 94 and in which are inserted the layers of the Bragg reflector 84,
  a layer of silica 104 that separates the layers 94 and 96, and
  a layer of silica 106 formed above the layer 96.

The optimisation of the device represented in FIG. 8 consists
  firstly, in determining the etching depths and the period of the diffraction gratings that will make it possible to inject the light stemming from a singlemode optical fibre into this device, with the same angle of incidence for each grating, and
  then, in determining the respective thicknesses of the three layers of silica 102, 104, 106 in order to obtain coupling efficiencies that are identical and as high as possible for the two polarisations TE and TM.

The result of this optimisation leads to a structure having a coupling efficiency of 62% for the two polarisations and for an incidence angle of 21° when the modulation depths of two diffraction gratings are 0.1 μm, with periods, or pitches, of 0.58 μm and 0.76 μm respectively for the amorphous silicon and for the silicon. The thicknesses of the layers of silica 102, 104 and 106 respectively equal 1.15 μm, 1.15 μm and 0.4 μm.

Figure 9:
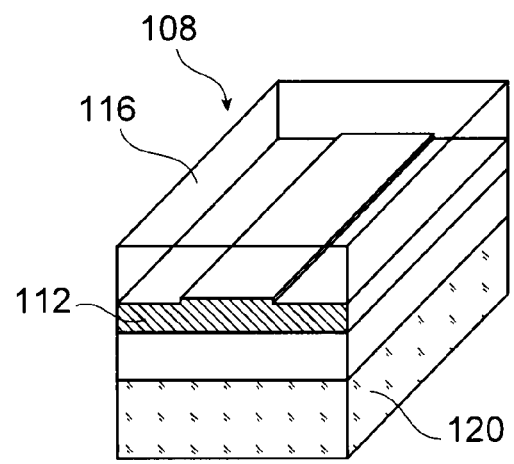
FIGS. 9 and 10 are schematic perspective views of optical waveguides that may be used in the invention, FIG. 11 schematically illustrates various steps of a method for manufacturing an example of the device of the invention, and FIG. 12 schematically illustrates a coupling by grating that may be used in the invention.
Figure 10:
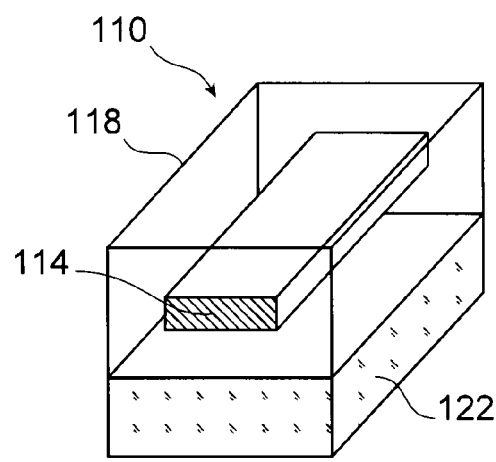

FIGS. 9 and 10 are schematic perspective views of examples of optical waveguides that may be used in the invention.

In FIG. 9 may be seen an optical ridge waveguide 108 and, in FIG. 10, an optical stripe waveguide 110. The optical waveguide 108 or 110 includes a core made of silicon 112 or 114 in a cladding made of silica 116 or 118 and rests on a substrate 120 or 122.

The silicon core of the optical ridge waveguide is partially etched laterally and the dimensions of the mode of said optical waveguide typically equal 0.5 μm×0.2 μm. The silicon core of the optical stripe waveguide is, for its part, totally etched laterally and the dimensions of the mode of said optical waveguide typically equal 0.9 μm×0.4 μm.

Instead of being made of silicon, these optical waveguides may be for example made of InP or silica doped with phosphorous, boron or germanium.

Parts A to G of FIG. 11 schematically illustrate an example of a sequence of steps A) to G) making it possible to form a device in accordance with the invention, comprising stripe type waveguides and coupling gratings, by microelectronic methods of deposition/photolithography/etching.

A) The starting point is a substrate 124 made of bulk silicon (sectional side view).

B) A layer 126 of silica of a thickness greater than 1.2 μm is deposited, from TEOS, in other words tetraethoxysilane, to avoid the losses in the substrate.

C) A layer of silicon 128 is deposited on the layer 126, by PECVD, to form therein the optical waveguide and the gratings.

D) A lithography is carried out in the deep ultraviolet (DUV), at 248 nm, in a photolithography resin layer 130 formed on the layer 128 to form intermediate gratings 132 and 134 in the layer 130.

E) A partial etching of the layer of silicon 128 is carried out to form therein the corresponding gratings 136 and 138 of the device.

F) A lithography is carried out in the deep ultraviolet (DUV), at 248 nm, to form optical waveguides 140 and 142, which are necessary to the device (top view), then a total etching of the silicon down to the silica is carried out to form stripe waveguides such as the stripe waveguide 144.

G) A deposition of encapsulation silica 146 from TEOS is carried out.

To form two stacked circuits, it suffices to continue with a step of chemical-mechanical polishing of the encapsulation silica, adjusted in thickness, and to repeat the manufacturing sequence, beginning with the deposition of amorphous silicon.

As has been seen, the coupling structures used in the invention are typically 1-D diffraction gratings. Indeed, it is well known that a periodic structure of grating type makes it possible to couple a part of the incident light (perpendicular or sloping) into an optical waveguide placed in the same plane as the grating. The other part of the light, which is not coupled into the guide, is simply transmitted by the grating.

Typically, the coupling rate in the optical waveguide is around 50% to 80%.

Figure 12:
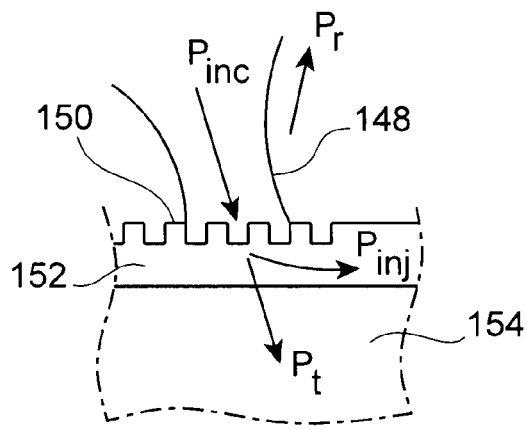

FIG. 12 schematically illustrates an example of coupling of a light beam 148 with a 1-D grating 150 formed in an optical waveguide 152, itself formed on a substrate 154.

The references Pinc, Pinj, Pt and Pr represent respectively the luminous intensity of the incident beam, the luminous intensity injected into the grating, the luminous intensity transmitted by it and the luminous intensity reflected by it.

Other coupling structures may be used in the invention. For example, the following gratings may be envisaged:
  gratings in which the patterns are curved and not straight,
  gratings in which the pitch is variable from one pattern to the next,
  photonic crystals in which the patterns are small holes, and no longer stripes, and
  diffractive optics in which the patterns are close to the wavelength: between 10 times more and ten times less than the wavelength.

Moreover, instead of optically coupling the integrated photonic circuit of a device in accordance with the invention with a single optical waveguide, for example a single optical fibre, it is possible to couple it to several optical waveguides, for example several optical fibres.

The invention claimed is:

1. An optical device comprising:
  a substrate and,
  on said substrate, an integrated photonic circuit adapted to be optically coupled to at least one optical waveguide to transmit a light signal and further adapted for processing the light signal, wherein the integrated photonic circuit comprises first and second elementary integrated photonic circuits which are superimposed, the first and second elementary integrated photonic circuits being adapted to, respectively, be coupled to first and second given polarisation states of the light signal and for processing said given first and second polarisation states, respectively, and wherein each of the first and second elementary integrated photonic circuits includes a coupling part which is adapted to be coupled to the optical waveguide, and the respective coupling parts of the first and second elementary integrated photonic circuits are superimposed.

2. An optical device according to claim 1, wherein the second elementary integrated photonic circuit is between the substrate and the first elementary integrated photonic circuit, the first elementary integrated photonic circuit being configured to receive the light signal and adapted to be coupled to a first polarisation state of the light signal, the second elementary integrated photonic circuit being adapted to be coupled to a second polarisation state of the light signal.

3. An optical device according to claim 1, wherein the first and second elementary integrated photonic circuits are nanophotonic circuits.

4. An optical device according to claim 1, wherein the coupling part of each of the first and second elementary integrated photonic circuits is adapted to be coupled to the corresponding given polarisation state of the light signal, and each of the first and second elementary integrated photonic circuits further includes a part for processing the given polarisation state of the light signal thus coupled.

5. An optical device according to claim 4, wherein the second elementary integrated photonic circuit is between the substrate and the first elementary integrated photonic circuit, the first elementary integrated photonic circuit being configured to receive the light signal and adapted to be coupled to a first polarisation state of the light signal, the second elementary integrated photonic circuit being adapted to be coupled to a second polarisation state of the light signal and wherein the coupling part of the first elementary integrated photonic circuit is adapted to be coupled to the first polarisation state of the light signal, and the coupling part of the second elementary integrated photonic circuit is adapted to be coupled to the second polarisation state of the light signal.

6. An optical device according to claim 4, wherein each coupling part includes a one dimensional diffraction grating.

7. An optical device according to claim 6, wherein each of the one dimensional diffraction gratings comprises parallel lines and the lines of one of the one dimensional diffraction gratings are parallel to the lines of the other one dimensional diffraction grating.

8. An optical device according to claim 6, wherein each of the one dimensional diffraction gratings comprises parallel lines and the lines of one of the one dimensional diffraction gratings are perpendicular to the lines of the other one dimensional diffraction grating.

9. An optical device according to claim 4, wherein each coupling part includes a diffraction grating chosen among gratings with curved patterns, gratings with variable pitch from one pattern to the next, photonic gratings and diffractive optics.

10. An optical device according to claim 4, further comprising a light reflecting structure, placed below the set of superimposed coupling parts.

11. An optical device according to claim 1, further comprising a photodetector adapted to detect the first and second polarisation states which are respectively processed by the first and second elementary integrated photonic circuits.

12. An optical device according to claim 1, wherein said optical waveguide is an optical fiber.

* * * * *